United States Patent [19]

Edlinger et al.

[11] Patent Number: 6,059,854
[45] Date of Patent: May 9, 2000

[54] PROCESS FOR PROCESSING WASTE INCINERATION RESIDUES

[75] Inventors: Alfred Edlinger, Baden; Bruno Mistelli, Brugg, both of Switzerland

[73] Assignee: "Holderbank" Financiere Glarus AG, Glarus, Switzerland

[21] Appl. No.: 08/913,727

[22] PCT Filed: Jan. 23, 1997

[86] PCT No.: PCT/AT97/00007

§ 371 Date: Sep. 17, 1997

§ 102(e) Date: Sep. 17, 1997

[87] PCT Pub. No.: WO97/27339

PCT Pub. Date: Jul. 31, 1997

[30] Foreign Application Priority Data

Jan. 24, 1996 [AT] Austria ........................... 121/96

[51] Int. Cl.⁷ .................................................. C21B 3/08
[52] U.S. Cl. ................... 75/414; 75/434; 420/590
[58] Field of Search ................... 75/434, 414; 420/590

[56] References Cited

U.S. PATENT DOCUMENTS 5,259,863  11/1993  Schneider et al. .
5,405,429  4/1995  Rey et al. ........................ 75/434
5,516,357  5/1996  Edlinger et al. ................. 75/434
5,654,976  8/1997  Cowx et al. ..................... 373/79

FOREIGN PATENT DOCUMENTS 769 260   11/1971  Belgium .
024 250    2/1981  European Pat. Off. .
515 792   12/1992  European Pat. Off. .
572 769   12/1993  European Pat. Off. .
95/01312   1/1995  WIPO .

*Primary Examiner*—Melvyn Andrews
*Attorney, Agent, or Firm*—Pillsbury Madison & Sutro, LLP

[57] ABSTRACT

A method for processing solid waste incineration residues is disclosed in which the residues are introduced a steelworks slag bath in a sufficient amount so that the residues constitute from 15–45% by weight of the combined weight of the solid waste incineration residues and the steelworks slag bath. The residues are melted to effect the evaporation of heavy metals; which are drawn off from the steelworks slag bath to leave a heavy-metal-depleted slag bath. The residual bath is reduced with carbon carriers to form a slag phase and a pig iron phase. The slag phase can be granulated to produce mixed cement components.

6 Claims, No Drawings

PROCESS FOR PROCESSING WASTE INCINERATION RESIDUES

This application is the national phase of international application PCT/AT97/00007, filed Jan. 23, 1997 which designated the U.S.

BACKGROUND OF THE INVENTION

1. Field of the Invention

The invention relates to a process for processing waste incineration residues, such as, e.g., waste incineration slags, in which the slags are subjected to a reduction process while separating metals.

2. Description of the Related Art

In connection with processes for disposing of domestic and industrial waste, it has already been proposed to reduce in the liquid state slag phases forming during combustion on grounds of the oxidizing conditions involved, in order to recover metals and/or metal alloys. However, plants arranged to permit waste incineration, as a rule, are relatively complex. Small waste incineration plants are not readily operable in an economic manner. In particular, it is to be taken into account that waste incineration slags may contain relatively high portions of heavy metals and non-ferrous heavy metals. The dumping of such waste incineration slags is not readily feasible. Further processing of liquid waste incineration slags pre-supposes requirements such as suitable slag volumina, additional heating and hence additional energy feeding because of the unfavorable slag viscosity of slags forming in waste incineration.

SUMMARY AND DESCRIPTION OF THE INVENTION

The invention aims at processing waste incineration residues, such as, e.g., waste incineration slags, of various origin in an environmentally safe manner and directly producing products characterized by low contents of noxious matter and usable as raw materials for further use in steel-making plants. At the same time, the invention aims at producing from the waste incineration slag with initially unfavorable properties synthetic blast furnace slag exhibiting good hydraulic properties. To solve these objects the process according to the invention essentially involves introducing solid waste incineration residues into a steelworks slag bath in amounts ranging from 15 to 45% by weight, based on the overall quantity, drawing off the heavy metals or heavy metal compounds, such as, e.g., Zn, Pb, Cd or Hg chlorides, which evaporate during melting of the waste incineration residues or slag, and reducing the liquid bath with aid of carbon carriers and under the formation of an iron bath, whereupon the slag phase depleted from metals is granulated and used as a mixed cement component. By the fact that solid waste incineration residues are used, waste incineration residues of various origin may be collected and used. Also, by the fact that such waste incineration residues are introduced into a liquid steelworks slag bath, a mixed slag having a basicity corresponding to that of high-quality blast furnace slag is adjusted. By adjusting the basicity to values typical of high-quality blast furnace slag, which is achieved by adding waste incineration residues to a strongly basic steel works slag, the viscosity is substantially reduced and suitable metallurgical treatment may be effected at comparatively low temperatures. The neutralization heat released during neutralization by mixing the strongly basic steelworks slag with acidic waste incineration residues at the same time allows for melting of the waste incineration residues in a manner as largely autothermic as possible such that no or only little additional energy has to be fed while simultaneously lowering the viscosity. By using a steelworks slag bath in the liquid phase it has become possible to carry out, simultaneously with the lowering of the iron oxide content of the slag by separating iron, an accordingly common or fractionated separation of metallic phases while reducing the liquid slag bath with carbon carriers under the formation of an iron bath. In this manner, an iron bath having the quality of pig iron is immediately obtained, the composition of the original steelworks slag at the same time being adjustable towards a composition of a high-quality blast furnace slag with accordingly substantially enhanced hydraulic properties. In the course of the reduction procedure, relatively high portions of heavy metals can be safely separated and the remaining pig iron can be further used directly in the steel-making plant. On the whole, the process according to the invention may be realized following a steelworks process and by means of apparatus as are directly available in a steel-making plant such that additional apparative expenditures for the desired purification and disposal of the waste incineration residues may be obviated. On the whole, existing apparatuses may be employed without requiring remarkable adapatation work and the desired composition of the synthetic blast furnace slag may be selected by appropriately choosing and mixing the waste incineration residues used, it being feasible at the same time to work up a relatively high amount of solid waste incineration residues.

Advantageously, the process according to the invention may be realized in a manner that the liquidus temperature of the slag bath is maintained by blowing oxygen or air into the Fe bath carburized during reduction. From the steelworks slag bath, which contains high portions of iron oxide, an iron bath is separated during reduction, which iron bath will more readily sediment because of its reduced viscosity after the addition of the acidic waste incineration residues. On the whole, a residual amount of an iron bath may be charged already at the beginning of the process, which may be realized within the scope of a steelworks process anyway, wherein carbon is introduced into the iron bath for the purpose of reduction, thus causing the iron bath to be carburized. In order to limit the carbon content of the iron bath to values common for pig iron, the excess amount of carburization incurred in the course of the reduction of the slag bath due to equilibrium reactions taking place between the slag and bath may be used to maintain the liquidus temperature by blowing in oxygen or air and hence to gasify carbon to carbon monoxide. Such carbon monoxide formed in that manner causes a reduction of the iron oxide of the slag as well as optionally of heavy metals dissolve in the slag usually in the oxidic form, such as copper, tin, nickel and chromium. In this manner, the carbon monoxide forming advantageously at least partially may be fed to energetic utilization within the converter, wherein it is advantageously proceeded in a manner that the waste incineration residues are introduced into the steelworks slag into a, particularly bottom-blowing, converter equipped with $O_2$ or air nozzles. In principle, also other types of converters may, of course, be employed, operation with, for instance, electric furnaces with integrated afterburning or other reduction converters being conceivable. Yet, the use of a bottom-blowing OBM-converter constitutes a particularly preferred variant both in terms of apparatus and in terms of energy utilization.

In order to attain the desired slag viscosity, it is advantageously proceeded in a manner that 20 to 40% by weight of solid waste incineration residues is introduced into 60 to 80% by weight of steelworks or LD slag.

As already pointed out in the beginning, the pig iron formed by reduction in a particularly advantageous manner may be used as scrap in a steelmaking plant.

In order to ensure a particularly beneficial slag and iron bath control, in particular with high portions of nonferrous metals, it is advantageously proceeded in a manner that the reduction of the liquid slag phase is effected in at least two steps, wherein in a first phase the FeO content of the slag phase is maintained at between 1.5 and 5% by weight, preferably above 2% by weight, and the Fe bath is discharged and subsequently the slag is reduced to Fe—Mn, Fe—Cr and Fe—V alloys upon the addition of carbon-free reductants, such as, e.g., Al, Fe—Si. By the fact that the FeO content of the slag is maintained at above 1.5% by weight and advantageously above 2% by weight, Cr, V and Mn remain in the slag and separation in a selective manner is feasible after separation of the Fe bath in a second reduction in an enriched form. When introducing waste incineration residues in solid form into the steelworks slag bath, heavy metal chlorides and optionally oxides will evaporate first. In particular, zinc, lead, cadmium and mercury evaporate practically quantitatively. Chlorine compounds of copper, tin and nickel likewise are able to partially evaporate already at the introduction of solid waste incineration residues. Just chromium remains in the slag practically quantitatively, also a large portion of optionally present sulphur being incorporated in the slag. The heavy metals oxidically dissolved in the slag and, in particular, in the iron oxide of the slag, such as copper, tin, nickel and chromium, by means of carbon or carbon monoxide dissolved in the iron bath may readily and rapidly reduced into the iron regulus forming. If chromium oxide remains in the slag, this may be readily and rapidly reduced into the iron bath by adding aluminium or iron silicon or any other carbon-free reductants. On the whole, a reduced slag largely purified from nonferrous metals thus forms, which may be employed as an optimum mixed cement component or synthetic blast furnace cement. The end product is characterized by an extremely low content of heavy metals, the pig iron forming and having a comparatively high carbon portion being directly reusable in the liquid form in a steelmaking plant.

In the following the invention will be explained in more detail by way of an exemplary embodiment. LD slag having the following composition

| | |
|---|---|
| Steel | 20% by wt. |
| $SiO_2$ | 13% by wt. |
| $Al_2O_3$ | 1% by wt. |
| CaO | 33% by wt. |
| MgO | 4% by wt. |
| FeO | 21% by wt. |
| S | 0.05% by wt. |
| P | 0.5% by wt. |
| Cr | 0.15% by wt. | was introduced into a bottom-blowing converter at a ratio of 70:30 with waste incineration slag having the composition

| | |
|---|---|
| $SiO_2$ | 43% by wt. |
| CaO | 13% by wt. |
| $Al_2O_3$ | 8.5% by wt. |
| $Fe_2O_3$ | 10% by wt. |
| MgO | 1.5% by wt. |
| $Na_2O$ | 3.5% by wt. |
| $SO_3$ | 1% by wt. |
| TiO2 | 1.5% by wt. |
| CU | 0.4% by wt. |
| Ni | 0.04% by wt. |
| Cr | 0.15% by wt. |
| Zn | 0.35% by wt. |
| Pb | 0.15% by wt. | intensive mixing being effected. The mixed slag is characterized by the following composition:

| | |
|---|---|
| Steel | 17% by wt. |
| $SiO_2$ | 24% by wt. |
| CaO | 28% by wt. |
| $Al_2O_3$ | 6% by wt. |
| $Fe_2O_3$ | 18% by wt. |
| MgO | 3% by wt. |
| $Na_2O$ | 1% by wt. |
| $SO_3$ | 0.3% by wt. |
| $TiO_2$ | 0.6% by wt. |
| Cu | 0.15% by wt. |
| Ni | 0.02% by wt. |
| Cr | 0.2% by wt. |
| P | 0.35% by wt. |

After the reduction of the slag having been effected, a synthetic blast furnace slag having the following composition:

| | |
|---|---|
| $SiO_2$ | 38% by wt. |
| CaO | 43% by wt. |
| $Al_2O_3$ | 11% by wt. |
| MgO | 5% by wt. |
| $Na_2O$ | 2% by wt. | was formed, the reduction being effected in an OBM converter by aid of carbon, carbon monoxide and aluminum. Heavy metals no longer were detectable by means of X-ray fluorescence analysis in the pure slag obtained in that manner, from which it may be concluded that said metals may only be present by clearly below 100 ppm.

The water-granulated slag corresponds to hydraulically top-quality blast furnace slag in the mixed cement, standing out for an index according to Keil of larger than 100%.

The pig iron formed was recovered with the following composition:

| | |
|---|---|
| C | 3.5% by weight |
| Cu | 0.5% by weight |
| Ni | 0.1% by weight |
| Cr | 0.6% by weight |
| P | 1% by weight |
| Al | 1.5% by weight |
| Balance Fe | |

The pig iron stands out for a relatively low content of heavy metals and, in particular, a low content of copper, that iron being processible in a steelmaking plant in an advantageous manner.

What is claimed is:

1. A method for processing waste incineration residues comprising:

introducing solid waste incineration residues into a steelworks slag bath in a sufficient amount so that the solid waste incineration residues constitute from 15% by weight to 45% by weight of the combined weight of the solid waste incineration residues and the steelworks slag bath;

melting the waste incineration residues to evaporate heavy metals or heavy metal compounds and drawing off the evaporated heavy metals or heavy metal compounds from the steelworks slag bath to leave a heavy-metal-depleted slag bath;

reducing the heavy-metal-depleted slag bath with carbon carriers to form a slag phase and a pig iron phase; and granulating the slag phase to produce a mixed cement component.

2. The method of claim 1, further comprising maintaining the liquidus temperature of the slag bath during said reducing step by blowing oxygen or air into the pig iron phase.

3. The method of claim 1, wherein the solid waste incineration residues constitute from 20% by weight to 40% by weight of the combined weight of the solid waste incineration residues and the steelworks slag bath.

4. The method of claim 1, further comprising introducing the waste incineration residues into a bottom-blowing converter equipped with oxygen or air nozzles.

5. The method of claim 1, wherein the pig iron phase is processable in a steelmaking plant.

6. The method of claim 1, wherein said reduction step comprises maintaining the FeO content of the slag phase between 1.5% by weight and 5% by weight while discharging the pig iron phase and subsequently adding carbon-free reductants to reduce the slag phase to Fe—Mn, Fe—Cr, and Fe—V alloys.

* * * * *